United States Patent
Cohen

(10) Patent No.: US 9,576,346 B2
(45) Date of Patent: Feb. 21, 2017

(54) NON-LOCAL MEANS IMAGE DENOISING WITH AN ADAPTIVE DIRECTIONAL SPATIAL FILTER

(71) Applicant: Intel Corporation, Santa Clara, CA (US)

(72) Inventor: Anna Cohen, Petach-Tikva (IL)

(73) Assignee: Intel Corporation, Santa Clara, CA (US)

( * ) Notice: Subject to any disclaimer, the term of this patent is extended or adjusted under 35 U.S.C. 154(b) by 109 days.

(21) Appl. No.: 14/667,548

(22) Filed: Mar. 24, 2015

(65) Prior Publication Data

US 2016/0284065 A1   Sep. 29, 2016

(51) Int. Cl.
*G06T 5/00* (2006.01)
*G06T 5/10* (2006.01)

(52) U.S. Cl.
CPC ........... *G06T 5/002* (2013.01); *G06T 5/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,231,677 | A * | 7/1993 | Mita | G06T 7/0095 348/625 |
| 6,178,205 | B1 * | 1/2001 | Cheung | H04N 5/145 348/E5.066 |
| 7,386,158 | B2 * | 6/2008 | Yamada | G06T 5/004 382/132 |
| 7,664,356 | B2 * | 2/2010 | Hongo | G02B 6/032 385/125 |
| 7,848,589 | B2 * | 12/2010 | Hasegawa | G06T 5/20 382/191 |

(Continued)

FOREIGN PATENT DOCUMENTS

JP   2014179971   9/2014

OTHER PUBLICATIONS

Marimont et al., "A Probabilistic Framework for Edge Detection and Scale Selection", IEEE Sixth International Conference on Computer Vision, Jan. 4-7, 1998, Bombay, IN (8 pages).

(Continued)

*Primary Examiner* — Anand Bhatnagar
(74) *Attorney, Agent, or Firm* — Green, Howard & Mughal LLP

(57) ABSTRACT

System, apparatus, method, and computer readable media for edge-enhanced non-local means (NLM) image denoising. In embodiments, edge detail is preserved in filtered image data by weighting of the noisy input target pixel value with other pixel values based on self-similarity and further informed by a data-driven directional spatial filter. Embodiments herein may denoise regions of an image lacking edge characteristics with a more uniform spatial filter than those having edge characteristics. In embodiments, directionality of a spatial filter function is modulated based on an edge metric to increase the weighting of pixel values along an edge when there is a greater probability the edge passes through the target pixel. In further embodiments, the adaptive spatial filter is elliptical and oriented relative to a spatial gradient direction with non-uniform filter widths that are based on the edge metric.

20 Claims, 6 Drawing Sheets

(56) References Cited

U.S. PATENT DOCUMENTS

| | | | | |
|---|---|---|---|---|
| 8,055,075 B1* | 11/2011 | Tamura | ................... | G06T 5/20 |
| | | | | 382/199 |
| 8,218,082 B2* | 7/2012 | Chiu | ................... | G06T 5/20 |
| | | | | 348/608 |
| 8,260,076 B1 | 9/2012 | Yang et al. | | |
| 2003/0053708 A1* | 3/2003 | Kryukov | ............. | H04N 19/865 |
| | | | | 382/261 |
| 2006/0170979 A1* | 8/2006 | Hasegawa | ................. | G06T 5/20 |
| | | | | 358/3.27 |
| 2009/0238488 A1* | 9/2009 | Joon-Ki | ................. | G06T 3/403 |
| | | | | 382/264 |
| 2010/0315558 A1 | 12/2010 | Chiu et al. | | |
| 2013/0329135 A1* | 12/2013 | Baqai | ................... | G06T 5/002 |
| | | | | 348/624 |
| 2014/0226905 A1 | 8/2014 | Yahata et al. | | |

OTHER PUBLICATIONS

Kumar et al., "Image Denoising Based on Non Local-Means Filter and it's Method Noise Thresholding", Signal, Image and Video Processing, 2012, DOI: 10.1007/s11760-012-0389-y; Central Research Laboratory, Bharat Electronics, Bangalore, IN (22 pages).
International Search Report and Written Opinion, mailed Jun. 7, 2016, for PCT Patent Application No. PCT/US2016/018323, 11 pages.

* cited by examiner

NON-LOCAL MEANS IMAGE DENOISING WITH AN ADAPTIVE DIRECTIONAL SPATIAL FILTER

BACKGROUND

Image denoising is an important functional block in an image-processing pipeline. The goal of image denoising methods is to recover the original image from a noisy measurement. Images generated by digital camera sensors pick up noise from a variety of sources, which should be reduced for aesthetic or practical (e.g., machine vision) purposes. Ideally, a noise reduction algorithm utilized by an image denoising block should improve image clarity by reducing noise while minimizing loss of real detail. The technical difficulty lies in robustly distinguishing noise from image details.

Many image denoising algorithms that perform some averaging or weighting of a pixel relative to a grouping of pixels spatially surrounding the target pixel are referred to as "local mean" or "local smoothing" filters. A Gaussian Blur filter is an example of a uniform local mean filter. Non-local image denoising algorithms have gained popularity in the last decade because, relative to many local means algorithms, post-filtering clarity is improved while the real detail loss is reduced. In a "non-local means" (NLM) algorithm, an NLM filter utilizes redundancy of self-similarity found within an image to reduce edge blurring by taking a mean of a greater number of pixels in the image, weighted by how similar the pixels are to the target pixel based on an comparison of multi-pixel patches. In some exemplary NLM algorithms, for each input pixel, a target patch containing the target pixel is determined Other candidate patches, typically limited to within a neighborhood of the target patch, are then assessed for similarity. An average pixel value may then be computed as a weighted average of the candidate patches according to the "self-similarity" weight assigned to the candidate patch through application of a similarity filter function.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION OF EXEMPLARY EMBODIMENTS

Figure 1:
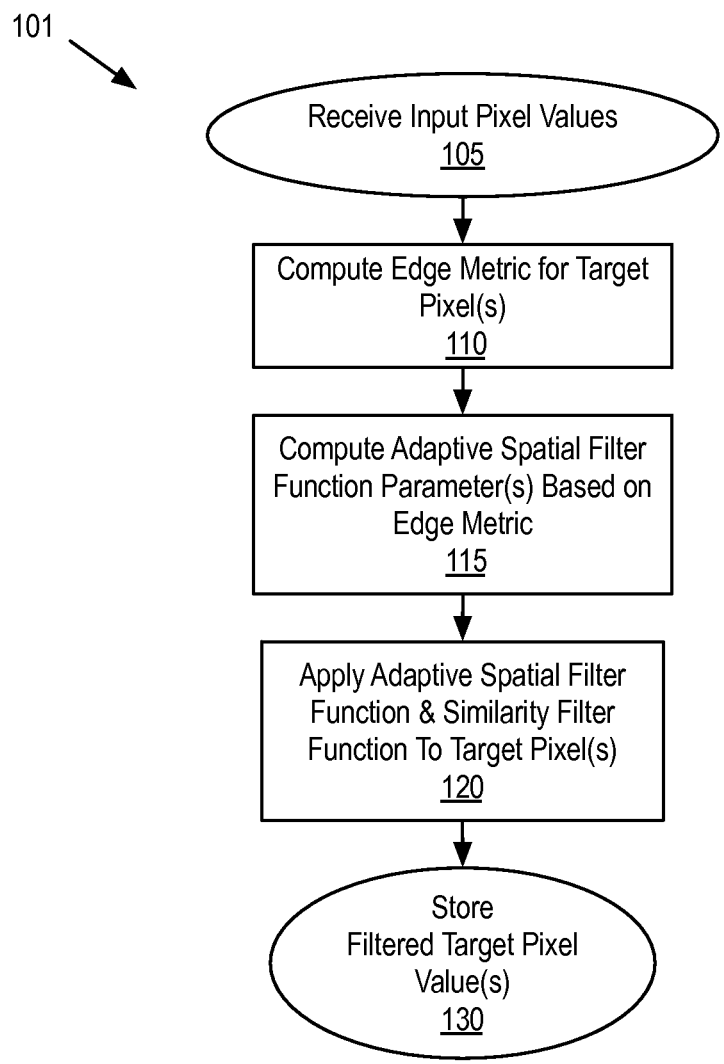
FIG. 1 is a flow diagram illustrating an adaptive directional non-local means image denoising method, in accordance with some embodiments.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the phrase "at least one of" or "one or more of" means any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth embodiments that may be manifested in architectures such system-on-a-chip (SoC) architectures for example. Implementation of the techniques and/or arrangements described herein are not restricted to particular architectures and/or computing systems, and may be implemented by any architecture and/or computing system for similar purposes. Various architectures employing, for example, multiple integrated circuit (IC) chips and/or packages, and/or various computing devices and/or consumer electronic (CE) devices such as set-top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein are implemented in hardware, for example as logic circuitry in a graphics processor. Certain other portions may be implemented in hardware, firmware, software, or any combination thereof. At least some of the material disclosed herein may also be implemented as instructions stored on a machine-readable medium, which may be read and executed by one or more processors (graphics processors and/or central processors). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

Although NLM denoising techniques often improve image quality over most local mean filters, the inventors have found NLM techniques suffer from unsmooth edges at low Signal-to-Noise Ratios (SNR). Image denoising techniques and hardware architectures capable of improving edge smoothness while preserving desirable attributes of the NLM techniques are therefore advantageous. Accordingly, one or more systems, methods, and computer readable media are described below for NLM image denoising enhanced, at least in part, through incorporation of an adaptive directional spatial filter. This edge-enhanced NLM denoising is referred to herein as "adaptive directional non-local means image denoising." In contrast to conventional NLM filters, which suffer poor edge smoothness as noise increases, the adaptive directional non-local means image denoising embodiments described herein actively account for edges passing through a target pixel by way of a spatial filter function that has directionality parameters adapted based on an edge metric determined for the target pixel. In some embodiments, a filtered pixel value is determined by applying a similarity filtering function and a directional spatial filtering function to an input target pixel value. In some embodiments, an edge metric assesses the probability that an edge passes through the target pixel, and one or more parameters of a spatial filter function controlling directionality of the spatial filter are computed based on the edge metric. In some embodiments, the adaptive spatial filter function has widths that vary from a uniform filter value to anisotropic filter values as a function of the edge metric. In some embodiments, a spatial gradient direction is determined for a target pixel and orientations of the anisotropic filter widths aligned relative to the gradient direction. Some embodiments herein may thereby denoise a first target pixel off an edge as a function of a more uniform spatial filter, and denoise a second target pixel on an edge as a function of a more anisotropic spatial filter. Where SNR is low and both target pixel and similar local patches are more noisy, NLM denoising with adaptive directional spatial filtering in accordance with some embodiments described herein have been found to add an edge bias that advantageously achieves a smoother edge without compromising detail preservation the manner often found with purely directional denoising algorithms.

FIG. 1 is a flow diagram illustrating an NLM image denoising method 101 in accordance with embodiments. Method 101 may be performed for all pixels in a discrete image I of area Ω with each iteration performed for one noisy input target pixel $p_{in}$ that is to be replaced with a filtered output pixel $p_{out}$. The iteration illustrated in FIG. 1 may be implemented either serially or in parallel across multiple threads or execution units in a parallel processing architecture. Each iteration/thread of method 101 begins with receiving input pixel values $p_i$ at operation 105. The values received as input include the input target pixel value $p_{in}$ to be filtered and a plurality of pixel values within a spatial neighborhood of the target pixel. In an exemplary embodiment, the spatial neighborhood is dimensioned to something smaller than Ω that includes $p_{in}$. Pixels outside this neighborhood are not given any weight in the determination of the filtered pixel value $p_{out}$. The spatial neighborhood may be of any predetermined size (e.g., a fixed K×K window smaller than an N×N pixel image frame) to correspondingly reduce the number of computations performed in method 101 for determination of a filtered pixel value $p_{out}$. In one embodiment, the size of the neighborhood, and therefore the size of the input pixel value sample received at operation 105, is predetermined to accommodate a particular non-local means algorithm, as further described below. Although definition of a neighborhood smaller than the N×N image is of practical advantage with respect to computational overhead, it is noted that embodiments herein are equally applicable to techniques that filter a target pixel with weights computed for all pixels within an N×N image.

In some embodiments, input pixel values $p_i$ are raw data in RGB space. While this raw data may be raw Bayer data, or the like, output by a camera sensor, in advantageous embodiments the pixel values $p_i$ have been preprocessed to some extent, for example linearized (including black level correction), and color shading corrected. The raw image data may also have had known bad pixels corrected, and lens shading corrections may have been performed upstream of denoising method 101. In some other embodiments, input pixel values $p_i$ received at operation 105 are in YUV space, with method 101 specifically operating on the luminance (Y) channel.

At operation 110, an edge metric $v_{edge}$ is computed for a target pixel $p_{in}$. Many edge detection methods are known in the art and may be employed at operation 110. Edge detection methods that return more than two states may be advantageously employed at operation 110. In some embodiments, the edge detection method performed at operation 110 returns an edge metric that varies over multiple levels between 0 and 1 (e.g., $0 \le v_{edge} < 1$) as a function of a certainty that an edge was found and/or of a probability that an edge passes through target pixel $p_{in}$. In some embodiments, a probabilistic edge detector is employed at operation 110. In some embodiments, edge detection at operation 110 entails computing the spatial gradient of one or more pixel values (e.g., intensity) at the target pixel $p_{in}$. Stronger edges associated with a gradient of greater magnitude may be assigned a metric indicative of a greater certainty. In one exemplary embodiment, an edge metric is determined at operation 110 by soft thresholding the gradient magnitude:

$$v_{edge} = \frac{\min(\max(R_g[x, y], T_1), T_2)}{T_2 - T_1}, \quad (1)$$

where $R_g[x, y]$ is the magnitude of the gradient at target pixel position x, y, and $T_1$, $T_2$ are two configurable thresholds. For such embodiments, the gradient magnitude may be determined following any known technique as embodiments are not further limited in this context. For example, a Sobel operator, Roberts Cross operator, Prewitt operator, or other similar gradient operator, may be employed.

At operation 115, one or more parameters of an adaptive spatial filter function are determined based on the edge metric. Driven by the image data, the spatial filter function parameter(s) computed at operation 115 are to adapt to the presence of an edge at target pixel $p_{in}$ modulating directionality of the spatial filter. A spatial filter in NLM denoising is to combine a spatially-based weighting with a similarity-based weighting so that pixels within a similar patch within a first region of the neighborhood window may be given greater importance than pixels positioned at a second region of the neighborhood window. Mathematically, NLM denoising in accordance with some embodiments is a multiplication of two filter functions:

$$f(n,m) = f_s(n,m) \cdot f_{ls}(n,m), \quad (2)$$

where $f_{ls}$ is the local similarity filter function controlling pixel weighting as a function of the similarity distance between a target patch and other patches in its neighborhood. The spatial filter function $f_s$ controls pixel weighting as a function of the spatial distance between a target patch and other patches in its neighborhood. In some embodiments, it is the spatial filter function $f_s$ that is to adapt to the image data through a response to the edge metric $V_{edge}$ computed for the target pixel $p_{in}$. Thus, whereas a constant spatial filter (e.g., a Gaussian kernel) is not data-driven and would simply assign spatial weights to pixels based on fixed priority within the neighborhood window (e.g., such that the central pixel in the window contribute more to the similarity distance than do pixels located at the edge of the window), the adaptive spatial filter in accordance with some embodiments herein is to assign spatial weights to pixels within the neighborhood window such that those pixels on an edge contribute more to the similarity distance than do pixels off an edge. While the adaptive spatial filter $f_s$ may take many forms to implement an edge-enhanced spatial pixel weighting, some exemplary embodiments are described in greater detail below in the context of FIG. 2, FIG. 3 and FIG. 4.

With the adaptive spatial filter function $f_s$ computed at operation 115, method 102 continues at operation 120 where the similarity filter function $f_{ls}$ and spatial filter function $f_s$ are applied to the target pixel $p_{in}$ by evaluating the patches within the neighborhood window to arrive a the filtered target pixel $p_{out}$. The filtered output target pixel value $p_{out}$ is then stored at operation 130, for example to an electronic memory, such as, but not limited to a register, volatile memory cell, non-volatile memory cell, etc. Input target pixel $p_{in}$ is incremented over multiple serial iterations of method 101, or over multiple parallel threads until all pixels in an image I have been likewise filtered. In further embodiments, filtered pixel value $p_{out}$ is further output to a display pipeline, and/or encoding pipeline, and/or wireless transmission pipeline.

Figure 2:
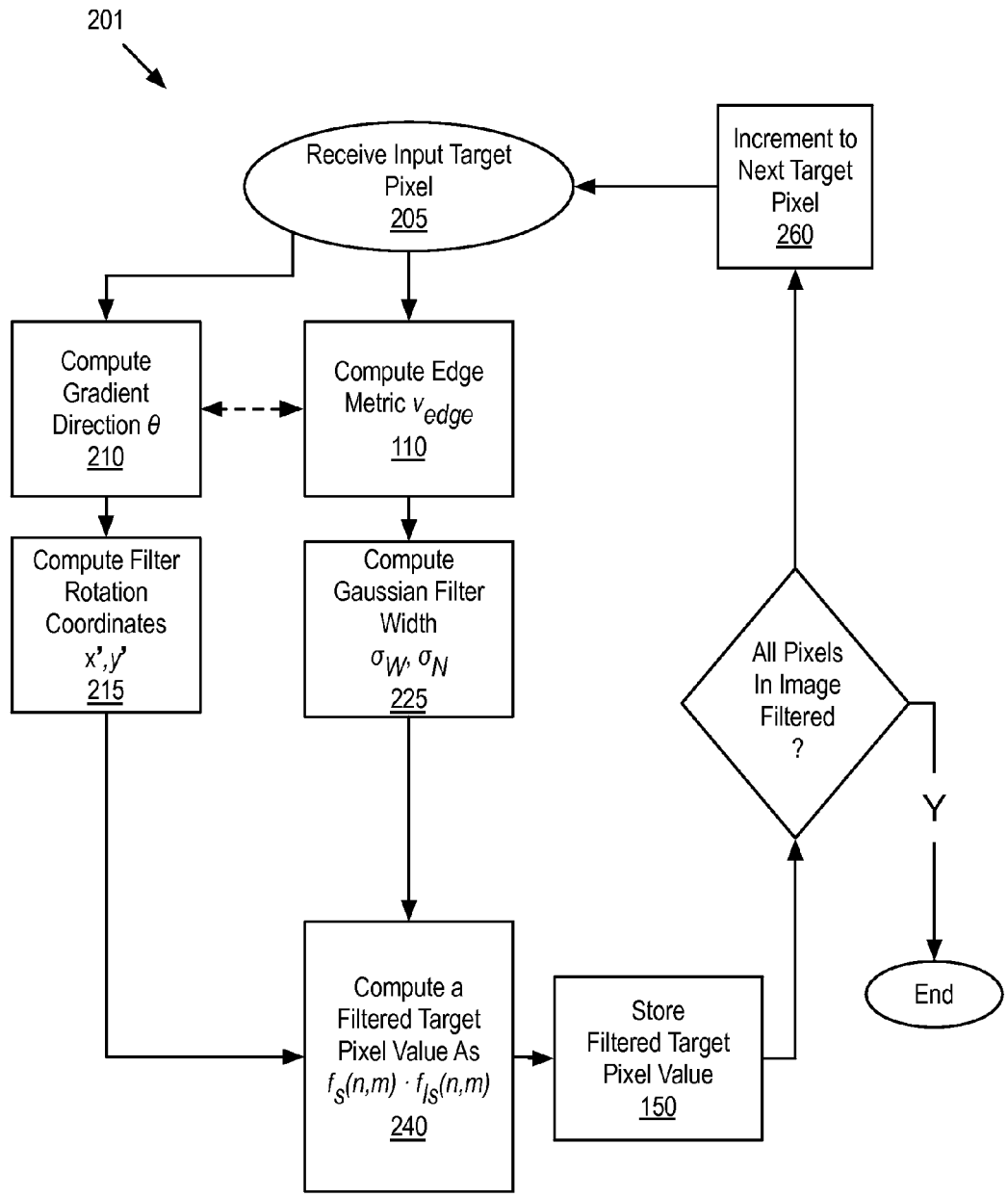
FIG. 2 is a flow diagram illustrating an adaptive directional non-local means image denoising method employing an adaptive directional Gaussian spatial filter, in accordance with some embodiments.
Figure 3:
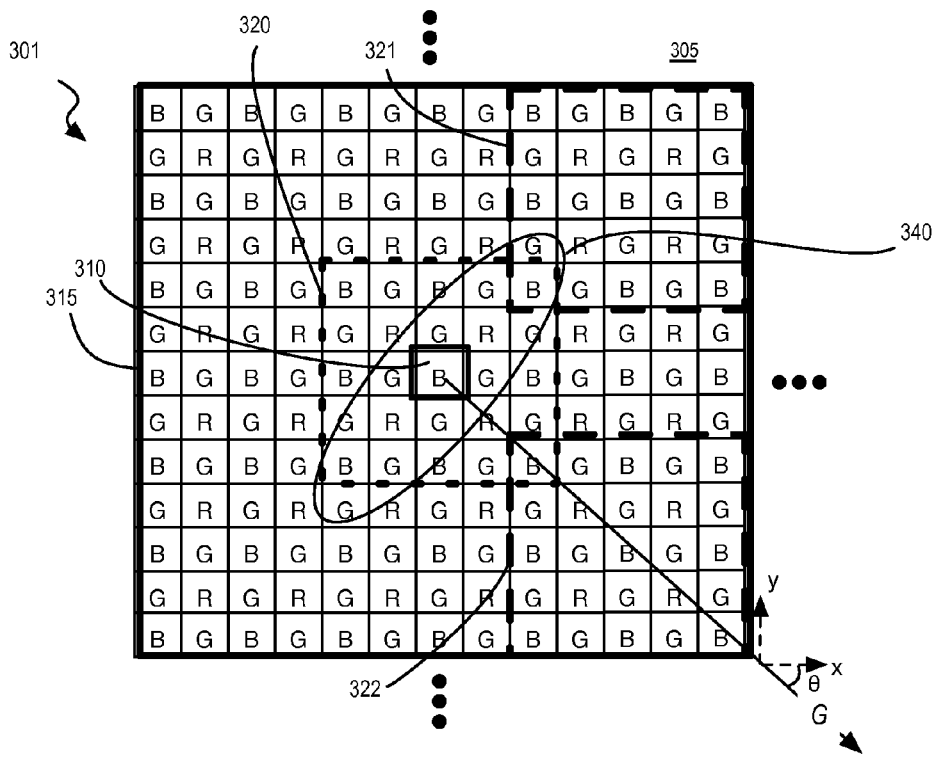
FIG. 3 is a graph illustrating dependence of spatial filter directionality as a function of an edge metric, in accordance with embodiments.
Figure 4:
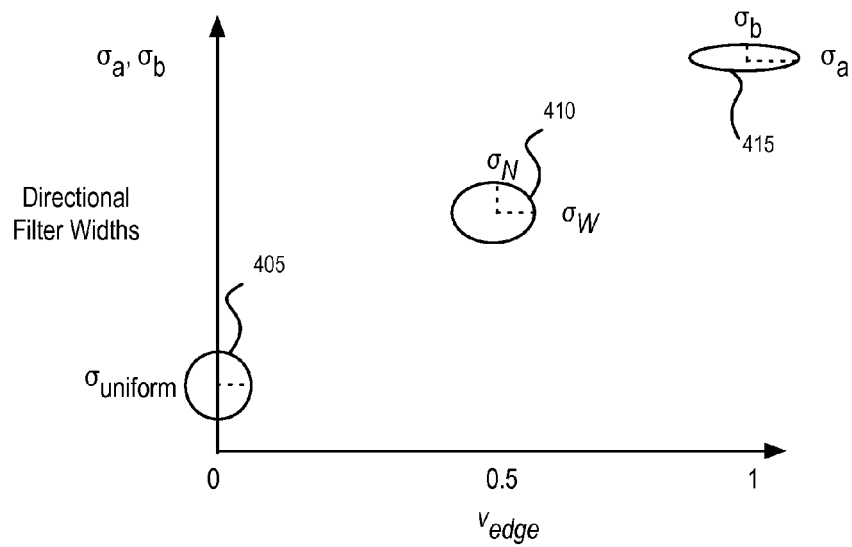
FIG. 4 is an illustration of input pixels of an image frame, in accordance with some embodiments.

FIG. 2 is a flow diagram illustrating a non-local means image denoising method 201 employing an adaptive directional Gaussian filter, in accordance with some embodiments. FIG. 3 is an illustration of input pixels of an image frame, which, in accordance with some embodiments, are processed with non-local means image denoising method 201. FIG. 4 is a graph illustrating a dependence of parameters controlling the directionality of an adaptive directional Gaussian filter as a function of an edge metric, in accordance with some embodiments. Directionality of the adaptive directional Gaussian filter employed in method 201 may, for example, be modulated based on the computed edge metric in the manner illustrated in FIG. 4.

Referring first to FIG. 2, in the exemplary method 201 the adaptive directional spatial filter introduced in the context of method 101 is implemented as an adaptive directional Gaussian filter where the spatial filter $f_s$ as a function of pixel grid coordinates takes the form:

$$f_s(x, y) = e^{-\left(\frac{x'^2}{\sigma_W^2} + \frac{y'^2}{\sigma_N^2}\right)}, \quad (3)$$

where spatial filter rotation coordinates x' and y' and filter widths aw and UN are described further below. For such embodiments, the Gaussian function is to be modulated to be more and less elliptical (e.g., circular) as a function of an edge metric (e.g., probability target pixel is on an edge). The orientation of the directional filter is to be determined relative to a direction of an edge passing through the target pixel, for example with a longer width of the directional filter oriented parallel to the edge (i.e., orthogonal to a spatial gradient evaluated at the target pixel).

Method 201 begins with receiving the target pixel at operation 205. Along with the input target pixel $p_{in}$, values of other pixels in the image frame I may be received or rendered accessible to the engine executing method 201. In some embodiments, all pixels within a local neighborhood surrounding the target pixel $p_{in}$ are received at operation 205. As shown in FIG. 3, an image or frame 301 includes a spatially correlated 2D pixel array 305 of N×N dimension. In the depicted embodiment, values of pixel array 305 are in RGB space. Within pixel array 305 is a local neighborhood 315 of K×K dimension surrounding target pixel 310. Pixel values from pixel array 305 may be received as input pixels $p_{in}$ at operation 205 (FIG. 2), for example.

As further illustrated in FIG. 2, method 201 proceeds to operation 210 where a spatial gradient direction θ is computed for the target pixel $p_{in}$. Notably, operation 210 is illustrated as potentially independent of the edge metric computation at operation 110 to allow for separate optimization of the computations. Results computed in either operation 110 or 210 may inform the other however, as denoted by the dashed line in FIG. 2. In some embodiments the spatial gradient direction θ may be readily determined from a gradient magnitude computation performed as part of an edge detection algorithm employed at operation 110. A gradient operator (e.g., Sobel) kernel may be applied to compute a gradient component in each orientation of the pixel array or grid (e.g., $|G|=\sqrt{G_x^2+G_y^2}$) at operation 110, in which case angle of orientation of the edge relative to the pixel array giving rise to the spatial gradient may be readily determined at operation 210. In alternative embodiments, for example where |G| is estimated directly, the spatial gradient direction θ may be determined independently through any known technique as embodiments are not further limited in this respect. FIG. 3 further illustrates an exemplary spatial gradient vector G having a direction θ within neighborhood 315.

Returning to FIG. 2, method 201 continues to operation 215 where spatial filter rotation coordinates x' and y' are computed. Rotation coordinates x' and y' are to orient the directional filter relative the pixel grid. In some embodiments, rotation coordinates x' and y ' are based on the spatial gradient direction θ. In one exemplary embodiment, rotation coordinates x' and y' are computed with a rotated coordinates vector:

$$\begin{bmatrix} x' \\ y' \end{bmatrix} = \begin{bmatrix} \cos\theta & -\sin\theta \\ \sin\theta & \cos\theta \end{bmatrix}\begin{bmatrix} x \\ y \end{bmatrix}, \quad (4)$$

where x and y are the positional coordinates of the target pixel $p_{in}$ within the image I.

In some embodiments, width parameters of a directional Gaussian filter are computed based on an edge metric. In method 201 for example, at operations 225 at least one of spatial filter width parameters $\sigma_W$ and $\sigma_N$ are computed as a function of edge metric $v_{edge}$. In advantageous embodiments both filter width parameters $\sigma_W$ and $\sigma_N$ are computed as one or more function of edge metric $v_{edge}$. In some embodiments, the filter width parameters $\sigma_W$ and $\sigma_N$ are to be a function of edge metric $v_{edge}$ that increases the directionality of the Gaussian filter in response to greater certainty that the target pixel is on an edge. In some embodiments, the filter width parameters $\sigma_W$ and $\sigma_N$ vary from uniformity ($\sigma_W=\sigma_N$) to non-uniform (e.g., $\sigma_W>\sigma_N$) as a function of edge metric $v_{edge}$. In one exemplary embodiment where $v_{edge}$ increases from 0 to 1 with a 0 indicative of a failure to detect an edge, and 1 indicative of detecting an edge with a greatest amount of certainty, the spatial filter width parameters $\sigma_W$ and $\sigma_N$ are computed as:

$$\sigma_W=v_{edge}\cdot\sigma_b+(1-v_{edge})\cdot\sigma_{uniform} \quad (5)$$

$$\sigma_N=v_{edge}\cdot\sigma_a+(1-v_{edge})\cdot\sigma_{uniform}, \quad (6)$$

where $\sigma_{uniform}$, $\sigma_a$, and $\sigma_b$ are configurable parameters controlling the shape range for the convolution kernel. In some embodiments, these parameters have values satisfying the relationship: $\sigma_a>\sigma_{uniform}>\sigma_b$. In FIG. 4, the effect of an adaptive directional Gaussian filter shape is depicted as $\sigma_W$ and $\sigma_N$ depend on the edge metric $v_{edge}$ increasing from 0 to 1 (e.g., 0→no edge; and 1→edge with a greatest amount of certainty). In the limit of maximum certainty of an edge, maximally directional spatial filter 415 is achieved with filter width parameters $\sigma_W$ and $\sigma_N$ reaching major length $\sigma_c$, and minor length $\sigma_b$, respectively. In the limit of a failure to detect an edge, minimally directional spatial filter 405 is realized with filter width parameters $\sigma_W$ and $\sigma_N$ equating to $\sigma_{uniform}$. For edge metric values falling between these limits, a moderately directional filter 410 is realized.

Returning to FIG. 2, method 201 continues with application of adaptive directional filter function $f_s$ and a similarity filter function $f_{ls}$ in the NLM computation at operation 240. As further illustrated in FIG. 3, a target pixel patch 320 including target pixel 310 is compared to each of one or more candidate pixel patch 321, 322 within the set of all pixels of local neighborhood 315. Candidate pixel patches 321, 322 may for example be of a predetermined size, and overlap with a number of other candidate patches defined within neighborhood 215. The number of candidate patches 221 within a given neighborhood may for example be a function of the location of target pixel 210 within the image/frame (e.g., along an edge).

A candidate patch weight $W_i$ is computed corresponding to how similar each candidate patch is to the target pixel patch, referred to herein as "self-similarity." A candidate patch weight $W_i$ may for example be larger for a first candidate patch having greater similarity to the target patch than for a second candidate patch less similar to the target patch. Each candidate patch weight $W_i$ may be determined by way of any patch similarity scoring function to assess the similarity between the pixels i and $p_{in}$, for example with $0 \le W(i, p_{in}) \le 1$. Any technique known may be employed to arrive at a similarity weight as embodiments herein are not further limited in this respect. In one embodiment, the similarity measure is computed as the sum of absolute differences in pixel value (e.g., intensity). Such an embodiment may be advantageously implemented in fixed function or semi-programmable logic circuitry (e.g., an image signal processor). In some embodiments, $f_{ls}$ includes Gaussian kernel function where a squared sum of differences in pixel value is computed as the similarity measure.

The candidate patch weight is further a function of adaptive directional filter function $f_s$ to weight candidate patches with a decay that is slower along an edge than the decay normal to the edge. In the example illustrated in FIG. 3 where a gradient G is present at target pixel 310, a spatial filter 340 is oriented and directionalized sufficiently to weight patch 321 more heavily than is patch 322. Application of the similarity and spatial filter functions $f_{ls}$ and $f_s$ described above may be discretized by the pixels, and in some embodiments computation of the filtered pixel value proceeds as:

$$I'[x_t, y_t] = \frac{1}{C(x_t, y_t)} \sum_{x \in \Omega} \sum_{y \in \Omega} f_s(x, y) f_{ls}\left(\sum_{\Delta x \in \omega} \sum_{\Delta x \in \omega} d(I[x + \Delta x, y + \Delta y], I[x_t + \Delta x, y_t + \Delta y])\right) \cdot I[x, y], \quad (7)$$

where I[x,y] is the noisy input pixel and I'[$x_t, y_t$] is the filtered image value for a target patch position, C($x_t, y_t$) is a normalization constant, $f_s(x,y)$ is the directional spatial filter function evaluated over the image area Ω. Similarity function $f_{ls}$ is applied to difference d in pixel values of candidate patches and the target patch having patch areas co.

The filtered target pixel value computed at operation 240 is then stored to memory at operation 150. If all pixels of the image have been so filtered, method 201 ends. If not, method 201 continues with incrementing to a next target pixel at operation 260. Operations 205, 210, 110, 215, 225, 240, and 250 are then performed again substantially as described above. Once all filtered pixel values are determined, they may be stored as a denoised image according to any known technique. In further embodiments, filtered pixel values and/or denoised images are further output to a display pipeline, and/or encoding pipeline, and/or wireless transmission pipeline (not depicted).

Figure 5A:
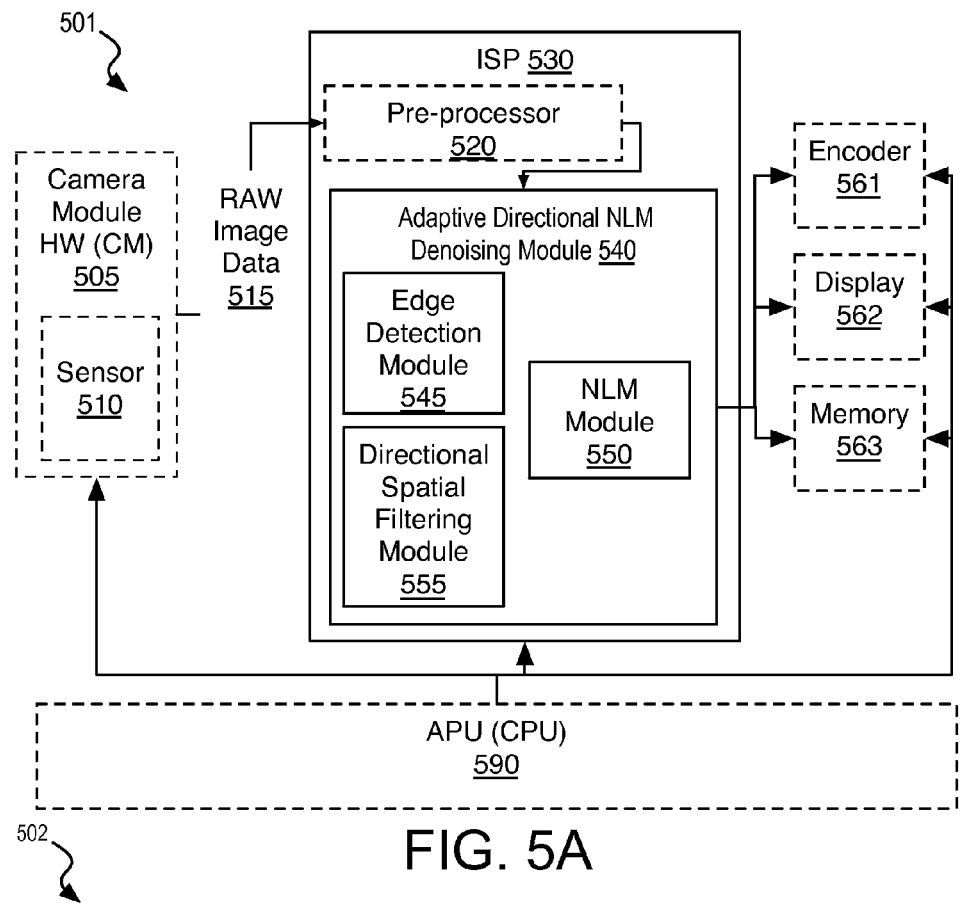
FIG. 5A is a functional block diagram of a system including an image-denoising module that includes an adaptive directional non-local means denoising module, in accordance with one or more embodiment.

FIG. 5A is a functional block diagram of a system 501 including an adaptive directional NLM image-denoising module 540, in accordance with one or more embodiment. Image processing system 501 includes an input port to receive input pixel values for a target pixel and a plurality of pixels within a spatial neighborhood of the target pixel. In some embodiments, the edge-enhanced NLM noise reduction techniques described herein and associated circuitry to perform the processing is positioned within an image pipeline to operate in the RGB space with input pixel values included in raw data 515.

In an illustrative embodiment, raw data 515 originates from camera hardware module (CM) 505 that includes a camera sensor 510, both of which may be included as part of system 501, or not, as denoted by the dashed line blocks. Sensor 510 may be a QXGA, WQXGA, or QSXGA-format digital image device, for example. Camera sensor 510 may provide a color resolution of 10 bits, or more per pixel, and may be further operable to capture continuous video frames progressively. Sensor 510 may have a pixel frequency of 170 MHz, or more. Camera sensor 510 may include an RGB Bayer color filter, an analog amplifier, an A/D converter, other components to convert incident light into a digital signal corresponding to raw image data. Sensor 510 may be controlled to operate a rolling shutter or electronic focal plane shutter process where pixels are read out progressively in a line-sequential fashion for a frame. Raw data is input to image signal processor (ISP) 530. ISP 530 is to receive and analyze frames of raw video data during the horizontal and/or vertical blanking periods associated with CM 505. During raw image data processing, ISP 530 performs noise reduction with NLM image denoise module 540. In the exemplary embodiment, ISP 530 further includes a preprocessor 520 to perform one or more of, pixel linearization, and shading compensation where raw Bayer data, or the like, output by camera sensor 505 is linearized (including also black level correction) and color shading corrected. The raw image data chromaticity (white balance) may be further calculated. Known bad pixel corrections, and lens shading corrections may also be performed upstream of denoise module 540. In an alternative embodiments, the amount of preprocessing performed by preprocessor 520 is minimal, for example including only dark noise removal upstream of denoise module 540.

In some embodiments, image denoising module 540 is implemented by logic circuitry of ISP 530. In alternate embodiments, image denoising module 540 is implemented as one or more thread instantiated on logic circuitry executing software instructions specifying the denoising pipeline for example on a programmable processor, such as a applications processing unit (APU) or central processing unit (CPU). Denoising module 540 may then be coupled to an output port of preprocessor 520, which may be implemented by logic circuitry of ISP 530. In still other embodiments, both pre-processor 520 and denoising module 540 are implemented as threads on a APU or CPU coupled to receive output from camera module 505.

Denoising module 540 includes an edge detection module 545, and an adaptive directional spatial filtering module 555. Edge detection module 545 includes logic (implemented through software programmable circuitry or fixed function logic circuitry) to compute an edge metric, for example in accordance with any embodiments described elsewhere herein. In some embodiments, edge detection module 545 further includes logic to calculate a spatial gradient direction, for example in accordance with any embodiments described elsewhere herein. Adaptive directional spatial filter module 555 includes logic (implemented through software programmable circuitry or fixed function logic circuitry) to compute one or more spatial filter parameters, such as width parameters, based on edge metric information (e.g., output from edge detection module 545). In some embodiments, adaptive directional spatial filter module 555 includes logic to compute one or more spatial filter parameters, such as a filter orientation parameter, based on gradient direction information (e.g., output by edge detection module 545. Denoising module 540 further includes NLM module 550 having logic (implemented through software programmable circuitry or fixed function logic circuitry) to compute a non-local mean of a target input pixel based on the input pixel values and adaptive directional spatial filtering parameters, for example output by adaptive directional spatial filter module 555. In some embodiments, NLM module 550 further includes logic circuitry to compute a patch weight for candidate patches within the neighborhood by performing a pixel value comparison between a number of candidate patches and a target patch of pixels within the neighborhood that contains the target pixel and by performing a positional comparison between a number of candidate patches and the target patch of pixel within the neighborhood to weight pixel values on an edge more heavily than those that do not.

As also illustrated in FIG. 5A, image processing system 501 further includes an output port coupled to at least of an electronic memory 563, a display 562, or an encoder 561. Memory 563 includes circuitry to store the filtered image pixel(s) as a filtered representation of the raw image data 511. Encoder 561 includes logic to encode the filtered image pixel as a filtered representation of raw image data 511. Display 562 includes circuitry to present the filtered image pixel(s) as a filtered representation of image data 511. In further embodiments, one or more of ISP 530 and image denoising module 540 is coupled to an APU (CPU) 590 having a user space and a kernel space. Applications executed on the user space may control denoising module 540 (e.g., defining configurable parameters of adaptive directional spatial filter module 555, such as $\sigma_a$, $\sigma_b$, etc.).

Figure 5B:
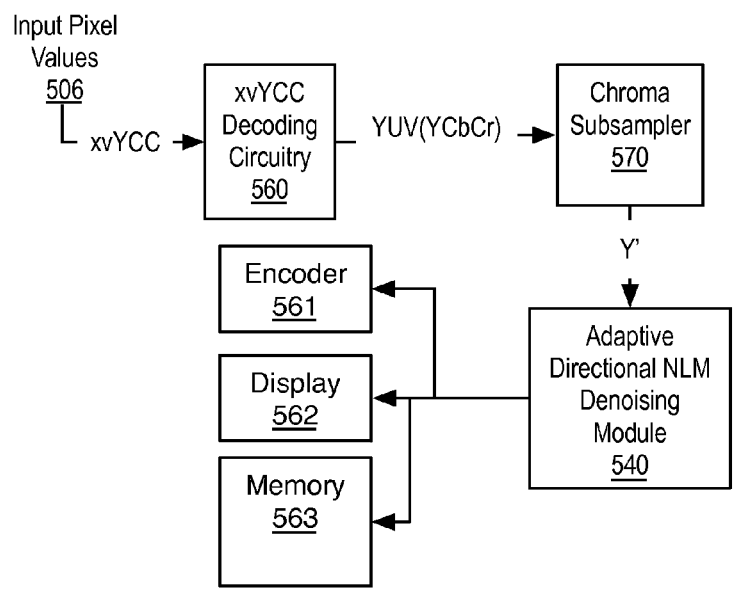
FIG. 5B is a functional block diagram of image processing pipeline including an adaptive directional non-local means denoising module, in accordance with one or more alternate embodiment.

FIG. 5B is a functional block diagram of a system 502 including adaptive directional NLM denoising module 540, in accordance with one or more embodiment. In this exemplary embodiment, the NLM noise reduction techniques and associated circuitry describe above is positioned within an image pipeline to operate in the color corrected and converted YUV data space. FIG. 5B illustrates one exemplary system architecture in which image denoise module 540 is operative as a down sample filter for a video processing pipeline. System 502 for example has a pixel value input port coupled to an output of a streaming video pipeline having any known configuration. This video pipeline may also include sensor 510 (FIG. 5A) operative to output raw video data associated with multiple consecutively exposed frames in conformance with any known streaming protocol, such as a MIPI or other protocol. In the exemplary embodiment, xvYCC input pixel data 506 received by system 502 is converted to YUV(Cb,Cr) format by decoding circuitry 560. Chroma subsampler 570 down samples, for example from 4:4:4 YUV data to 4:4:0 data. Denoise module 540 then operates on the subsampled Y' channel data in the chroma subsample data set with the modules substantially as described above in the context of FIG. 5A.

Figure 6:
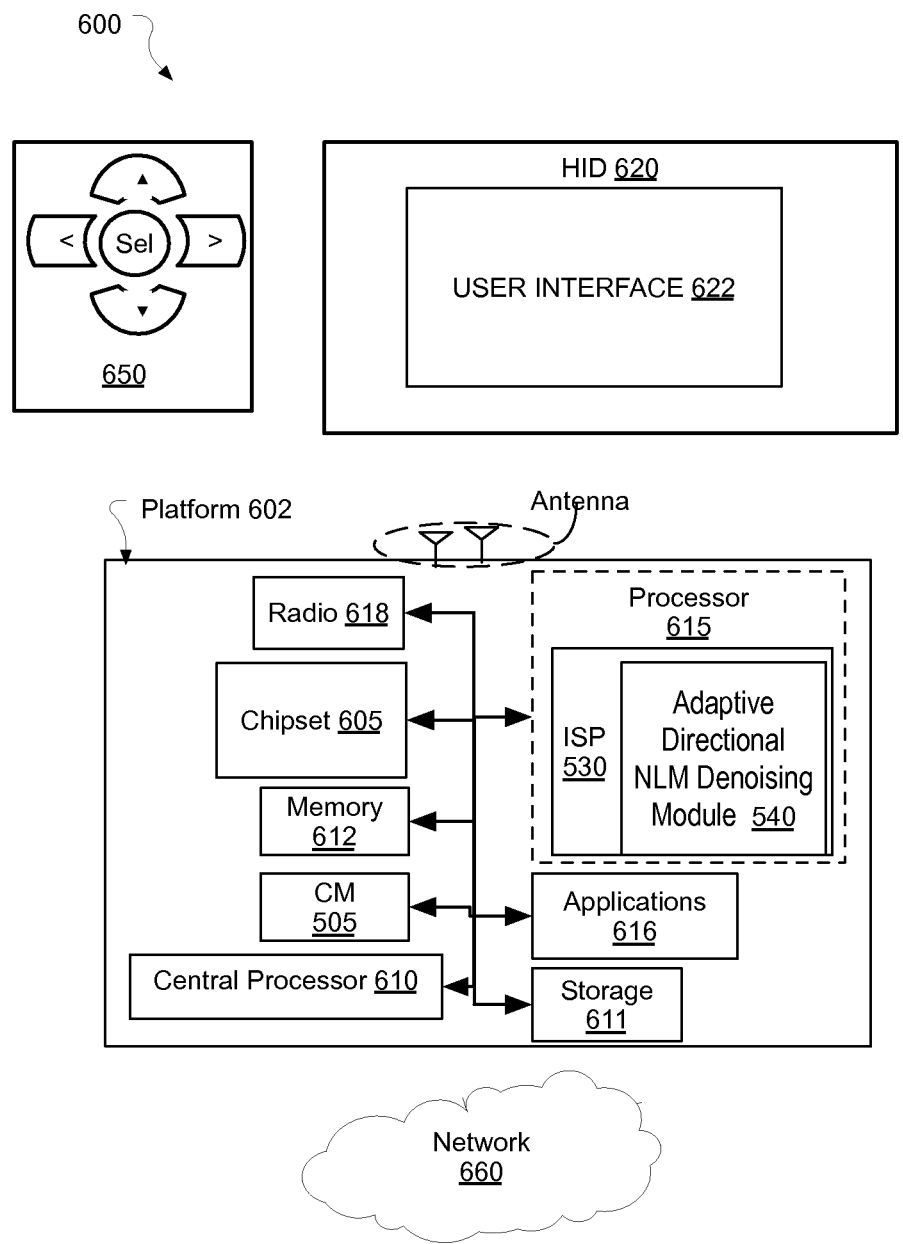
FIG. 6 is a diagram of an exemplary ultra-low power system employing an image processor including the system of FIG. 5A or 5B, in accordance with embodiments.

FIG. 6 is a diagram of an exemplary ultra-low power system 600 employing an adaptive directional NLM denoising module 540, in accordance with one or more embodiment. System 600 may be a mobile device although system 600 is not limited to this context. For example, system 600 may be incorporated into a wearable computing device, ultra-laptop computer, tablet, touch pad, handheld computer, palmtop computer, cellular telephone, smart device (e.g., smart phone, smart tablet or mobile television), mobile internet device (MID), messaging device, data communication device, and so forth. System 600 may also be an infrastructure device. For example, system 600 may be incorporated into a large format television, set-top box, desktop computer, or other home or commercial network device.

System 600 includes a device platform 602 that may implement all or a subset of the various adaptive directional NLM denoising methods systems described above in the context of FIG. 1-FIG. 5. In various exemplary embodiments, processor 615 executes adaptive directional NLM denoising algorithms. Processor 615 includes logic circuitry for example to implement any of the denoising algorithms described elsewhere herein. In some embodiments, one or more computer readable media may store instructions, which when executed by CPU 610 and/or processor 615, cause the processor(s) to execute one or more adaptive directional NLM denoising algorithm, such as any of those described in detail above. One or more image data frame filtered by image denoising module 540 may then be stored in electronic memory 612 as filtered image data.

In embodiments, device platform 602 is coupled to a human interface device (HID) 620. Platform 602 may collect raw image data with CM 505, which is filtered and output to HID 620. A navigation controller 650 including one or more navigation features may be used to interact with, for example, device platform 602 and/or HID 620. In embodiments, HID 620 may include any television type monitor or display coupled to platform 602 via radio 618 and/or network 660. HID 620 may include, for example, a computer display screen, touch screen display, video monitor, television-like device, and/or a television.

Under the control of one or more software applications 616, device platform 602 may display user interface 622 on HID 620. Movements of the navigation features of controller 650 may be replicated on a display (e.g., HID 620) by movements of a pointer, cursor, focus ring, or other visual indicators displayed on the display. For example, under the control of software applications 616, the navigation features located on navigation controller 650 may be mapped to virtual navigation features displayed on user interface 622.

In embodiments, device platform 602 may include any combination of CM 505, chipset 605, processors 610, 615, memory 612/storage 611, applications 616, and/or radio 618. Chipset 605 may provide intercommunication among processors 610, 615, memory 612, video processor 615, applications 616, or radio 618.

One or more of processors 610, 615 may be implemented as one or more Complex Instruction Set Computer (CISC) or Reduced Instruction Set Computer (RISC) processors; x86 instruction set compatible processors, multi-core, or any other microprocessor or central processing unit (CPU).

Memory 612 may be implemented as a volatile memory device such as, but not limited to, a Random Access Memory (RAM), Dynamic Random Access Memory (DRAM), or Static RAM (SRAM). Memory 612 may also be implemented as a non-volatile storage device such as, but not limited to flash memory, battery backed-up SDRAM (synchronous DRAM), magnetic memory, phase change memory, and the like.

Radio 618 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (MC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Figure 7:
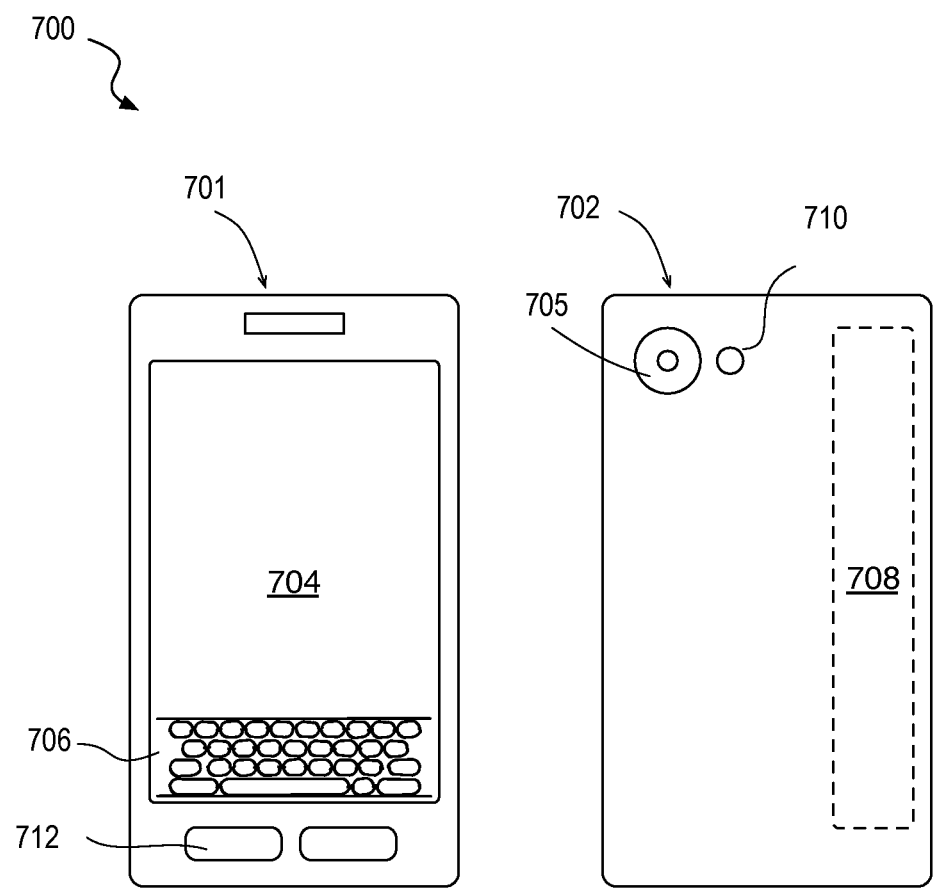
FIG. 7 is a diagram of an exemplary mobile handset platform, arranged in accordance with one or more embodiment.

As described above, system 600 may be embodied in varying physical styles or form factors. FIG. 7 further illustrates embodiments of a mobile handset device 700 in which system 600 may be embodied. In embodiments, for example, device 700 may be implemented as a mobile computing device having wireless capabilities. A mobile computing device may refer to any device having a processing system and a mobile power source or supply, such as one or more batteries, for example. Examples of a mobile computing device may include an ultra-laptop computer, tablet, touch pad, portable computer, handheld computer, palmtop computer, personal digital assistant (PDA), cellular telephone, combination cellular telephone/PDA, television, smart device (e.g., smartphone, tablet or smart television), mobile internet device (MID), messaging device, data communication device, and so forth. Examples of a mobile computing device also may include computers and/or media capture/transmission devices configured to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, mobile handset device 700 may include a housing with a front 701 and back 702. Device 700 includes a display 704, an input/output (I/O) device 706, and an integrated antenna 708. Device 700 also may include navigation features 712. Display 704 may include any suitable display unit for displaying information appropriate for a mobile computing device. I/O device 706 may include any suitable I/O device for entering information into a mobile computing device. Examples for I/O device 706 may include an alphanumeric keyboard, a numeric keypad, a touch pad, input keys, buttons, switches, microphones, speakers, voice recognition device and software, and so forth. Information also may be entered into device 700 by way of microphone (not shown), or may be digitized by a voice recognition device. Embodiments are not limited in this context. Integrated into at least the back 702 is camera 705 (e.g., including a lens, an aperture, and an imaging sensor), and a flash 710, both of which may be components of a CM through which image frames are exposed and output to an adaptive directional NLM denoising module, such as any of those implementation described elsewhere herein.

In some embodiments, the adaptive directional NLM denoising architecture and associated algorithms as described herein are implemented in various hardware architectures, cell designs, or "IP cores."

Embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood to be physically transformed into a system falling within the scope of the embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to exemplary embodiments, this description is not intended to be construed in a limiting sense. Hence, various modifications of the implementations described herein, as well as other implementations, which are apparent to persons skilled in the art to which the present disclosure pertains are deemed to be within the spirit and scope of the present disclosure.

The following paragraphs briefly describe some exemplary embodiments.

In one or more first embodiments, a computer-implemented non-local means image denoising method comprises receiving input pixel values of an image frame, and computing an edge metric associated with a target input pixel. The method further comprises computing one or more parameters, based on the edge metric, that specify directionality of a spatial filter function. The method further comprises determining a filtered target pixel value by applying a similarity filter function and the spatial filter function having the specified directionality to the input pixel values. The method further comprises storing the filtered target pixel value to an electronic memory.

In furtherance of the first embodiments, the adaptive spatial filter function comprises a directional Gaussian filter function having first and second filter widths, at least one of which is dependent upon the edge metric.

In furtherance of the first embodiment immediately above, the first and second filter widths are to vary between a most uniform filter width for a first edge metric value indicative of a failure to detect an edge, and predetermined maximum width and minimum widths at a second edge metric value indicative of an edge detected with highest confidence, wherein the uniform width is between the minimum and maximum widths.

In furtherance of the first embodiments, the edge metric comprises a probability of an edge passing through the target input pixel, and the directionality increases directly with the probability.

In furtherance of the first embodiments, further comprises determining a direction of a spatial gradient in the pixel values at the target pixel, and computing an adaptive directional spatial filter function further comprises orienting the directional filter relative to the gradient direction to decay weights of pixels on the edge more slowly than those off the edge.

In furtherance of the first embodiment immediately above, orienting the filter relative to the gradient direction further comprises applying a rotation matrix to the target pixel coordinates.

In furtherance of the first embodiments, computing the edge metric comprises thresholding a magnitude of a spatial gradient in the pixel values.

In furtherance of the first embodiments, determining the filtered target pixel value further comprises weighting the input target pixel value with one or more pixel patch values weighted by both a similarity of one or more candidate patches to a target patch including the target pixel, and a location of one or more candidate patches relative to an edge quantified by the edge metric.

In one more second embodiments, image denoising apparatus, comprising a means to perform any one of the first embodiments.

In one or more third embodiments, an image denoising apparatus comprises an input port to receive input pixel values of an image frame. The apparatus further comprises a denoising module coupled to the input port, and further including an edge detection module including logic to compute an edge metric associated with a target input pixel, a directional spatial filter module include logic to compute one or more parameters, based on the edge metric, that specify directionality of a spatial filter function, and a non-local means module to determine a filtered target pixel value by applying a similarity filter function and the spatial filter function having the specified directionality to the input pixel values, an output port coupled to the denoising module to output the filtered target pixel value to an electronic memory.

In furtherance of the third embodiments, the directional spatial filter module includes logic to compute a directional Gaussian filter function having first and second filter widths, at least one of which is dependent upon the edge metric.

In furtherance of the third embodiment immediately above, the directional spatial filter module includes logic to vary the first and second filter width between a most uniform filter width for a first edge metric value indicative of a failure to detect an edge, and predetermined maximum width and minimum widths at a second edge metric value indicative of an edge detected with highest confidence, wherein the uniform width is between the minimum and maximum widths.

In furtherance of the third embodiments, the edge detection module includes logic to compute a probability of an edge passing through the target input pixel, and the edge detection module includes logic to compute increase the directionality directly with the probability.

In furtherance of the third embodiments, the edge detection module includes logic determine a direction of a spatial gradient in the pixel values at the target pixel, and the directional spatial filter module includes logic to orient the directional filter relative to the gradient direction and decay weights of pixels on the edge more slowly than those off the edge.

In furtherance of the third embodiments immediately above, the directional spatial filter module includes logic to apply a rotation matrix to the target pixel coordinates.

In furtherance of the third embodiments, the edge detection module includes logic to threshold a magnitude of a spatial gradient in the pixel values.

In furtherance of the third embodiments, the non-local means module includes logic to weight the input target pixel value with one or more pixel patch values weighted by both a similarity of one or more candidate patches to a target patch including the target pixel, and by a location of one or more candidate patches relative to an edge quantified by the edge metric.

In one or more fourth embodiments, a mobile computing platform comprises the image denoising apparatus of the third embodiments, a camera hardware module (CM) coupled to the input to generate raw image data in an RGB space that includes the input pixel values, and at least one of the electronic memory, an encoder, or display coupled to the output port, the memory to store the filtered image pixel as a filtered representation of the image data, the encoder to encode the filtered image pixel as a filtered representation of the image data, and the display to present the filtered image pixel as a filtered representation of the image data.

In one or more fifth embodiments, one or more computer-readable storage media has instructions stored thereon, which when executed by a processor, cause the processor to perform any one of the first embodiments.

In one or more sixth embodiments, one or more computer-readable storage media includes instructions stored thereon, which when executed by a processor, cause the processor to perform a method comprising computing an edge metric associated with a target input pixel included in a set of input pixel values of an image frame, computing one or more parameters, based on the edge metric, that specify directionality of a spatial filter function, determining a filtered target pixel value by applying a similarity filter function and the spatial filter function having the specified directionality to the input pixel values, and storing the filtered target pixel value to an electronic memory.

In furtherance of the sixth embodiments, the media further includes instructions stored thereon, which when executed by the processor, cause the processor to perform a method further comprising determining a direction of a spatial gradient in the pixel values at the target pixel, wherein computing an adaptive directional spatial filter function further comprises orienting the directional filter relative to the gradient direction to decay weights of pixels on the edge more slowly than those off the edge, wherein the adaptive spatial filter function comprises a directional Gaussian filter function having first and second filter widths, at least one of which is dependent upon the edge metric, wherein the first and second filter width are to vary between a most uniform filter width for a first edge metric value indicative of a failure to detect an edge, and predetermined maximum width and minimum widths at a second edge metric value indicative of an edge detected with highest confidence, wherein the uniform width is between the minimum and maximum widths.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in embodiments, the above embodiments may include undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. An image denoising apparatus, comprising one or more processors to:
   receive input pixel values of an image frame;
   compute an edge metric associated with a target input pixel;
   compute one or more parameters, based on the edge metric, that specify directionality of a spatial filter function;
   determine a filtered target pixel value by applying a similarity filter function and the spatial filter function having the specified directionality to the input pixel values; and
   output the filtered target pixel value to an electronic memory.

2. The apparatus of claim 1, wherein the processors are to compute a directional Gaussian filter function having first and second filter widths, at least one of which is dependent upon the edge metric.

3. The apparatus of claim 2, wherein the processors are to vary the first and second filter width between a uniform filter width for a first edge metric value indicative of a failure to detect an edge, and predetermined maximum and minimum widths at a second edge metric value indicative of an edge detected with highest confidence, wherein the uniform filter width is between the minimum and maximum widths.

4. The apparatus of claim 1, wherein the processors are to:
   compute a probability of an edge passing through the target input pixel; and
   compute an increase in the directionality directly with the probability.

5. The apparatus of claim 1, wherein the processors are to:
   determine a direction of a spatial gradient in the pixel values at the target pixel; and
   orient the directional filter relative to the gradient direction and decay weights of pixels on an edge more slowly than those off the edge.

6. The apparatus of claim 5, wherein the processors are to apply a rotation matrix to the target pixel coordinates.

7. The apparatus of claim 1, wherein the processors are to threshold a magnitude of a spatial gradient in the pixel values.

8. The apparatus of claim 1, wherein the processors are to weight the input target pixel value with one or more pixel patch values weighted by both a similarity of one or more candidate patches to a target patch including the target pixel, and by a location of one or more candidate patches relative to an edge quantified by the edge metric.

9. A mobile computing platform, comprising:
   the image denoising apparatus of claim 1;
   a camera hardware module (CM) coupled to the processors are to generate raw image data in an RGB space that includes the input pixel values; and
   at least one of the electronic memory, an encoder, or display coupled to the processors, the memory to store the filtered image pixel as a filtered representation of the image data, the encoder to encode the filtered image pixel as a filtered representation of the image data, and the display to present the filtered image pixel as a filtered representation of the image data.

10. A computer-implemented non-local means image denoising method, comprising:
    receiving input pixel values of an image frame;
    computing an edge metric associated with a target input pixel;
    computing one or more parameters, based on the edge metric, that specify directionality of a spatial filter function;
    determining a filtered target pixel value by applying a similarity filter function and the spatial filter function having the specified directionality to the input pixel values; and
    storing the filtered target pixel value to an electronic memory.

11. The method of claim 10, wherein the adaptive spatial filter function comprises a directional Gaussian filter function having first and second filter widths, at least one of which is dependent upon the edge metric.

12. The method of claim 11, wherein the first and second filter widths are to vary between a uniform filter width for a first edge metric value indicative of a failure to detect an edge, and predetermined maximum and minimum widths at a second edge metric value indicative of an edge detected with highest confidence, wherein the uniform filter width is between the minimum and maximum widths.

13. The method of claim 10, wherein:
    the edge metric is indicative of a probability of an edge passing through the target input pixel; and
    the directionality increases directly with the probability.

14. The method of claim 10, further comprising:
    determining a direction of a spatial gradient in the pixel values at the target pixel; and
    wherein computing an adaptive directional spatial filter function further comprises orienting the directional filter relative to the gradient direction to decay weights of pixels on an edge more slowly than those off the edge.

15. The method of claim 14, wherein orienting the filter relative to the gradient direction further comprises applying a rotation matrix to the target pixel coordinates.

16. The method of claim 10, wherein computing the edge metric comprises thresholding a magnitude of a spatial gradient in the pixel values.

17. The method of claim 10, wherein determining the filtered target pixel value further comprises weighting the input target pixel value with one or more pixel patch values weighted by both a similarity of one or more candidate patches to a target patch including the target pixel, and a location of one or more candidate patches relative to an edge quantified by the edge metric.

18. One or more non-transitory computer-readable storage media, with instructions stored thereon, which when executed by a processing system, cause one or processors of the system to perform a method comprising:
    receiving input pixel values of an image frame;
    computing an edge metric associated with a target input pixel;
    computing one or more parameters, based on the edge metric, that specify directionality of a spatial filter function;
    determining a filtered target pixel value by applying a similarity filter function and the spatial filter function having the specified directionality to the input pixel values; and storing the filtered target pixel value to an electronic memory.

19. The media of claim 18, wherein the adaptive spatial filter function comprises a directional Gaussian filter function having first and second filter widths, at least one of which is dependent upon the edge metric.

20. The media of claim 19, wherein the first and second filter widths are to vary between a uniform filter width for a first edge metric value indicative of a failure to detect an edge, and predetermined maximum and minimum widths at a second edge metric value indicative of an edge detected with highest confidence, wherein the uniform filter width is between the minimum and maximum widths.

* * * * *